April 5, 1927.
T. DOMINICK
1,623,530
SUBSOIL DITCHER
Filed May 27, 1925
2 Sheets-Sheet 2
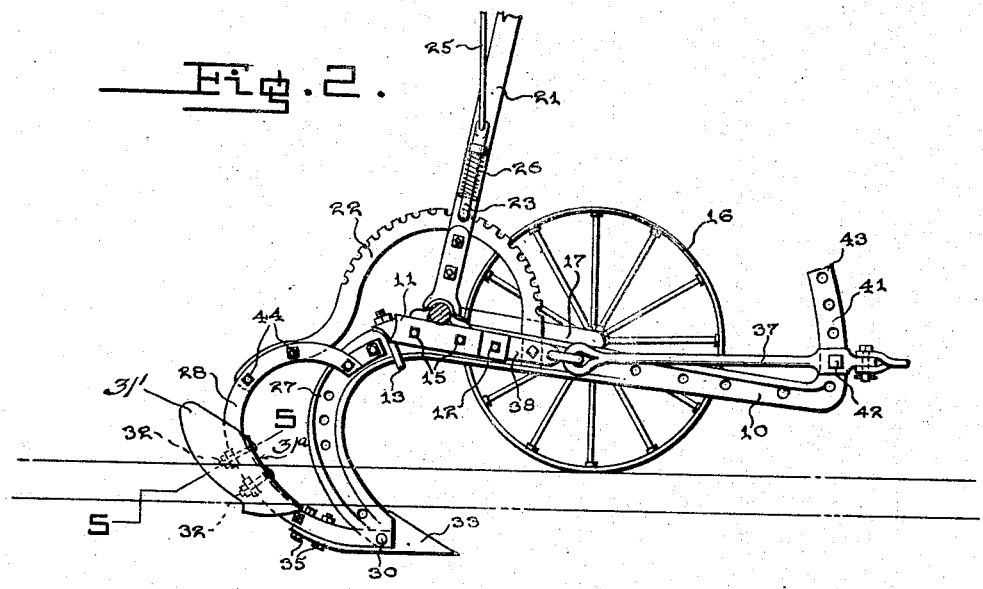
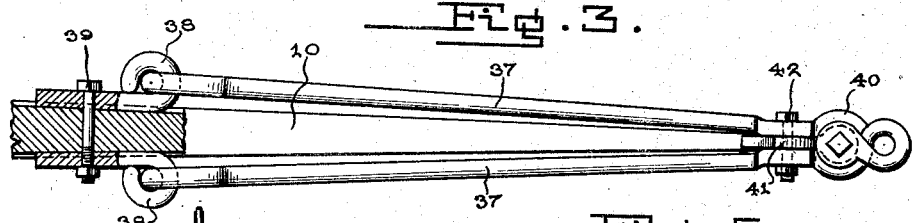
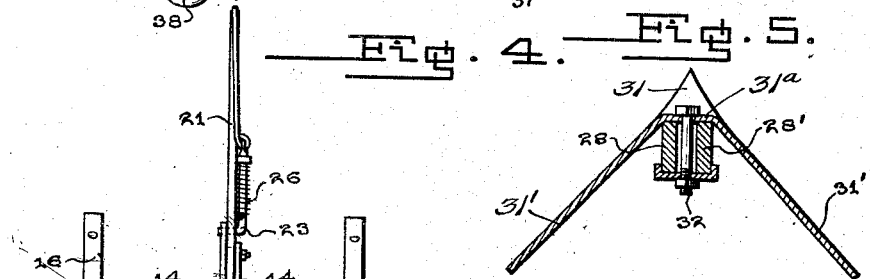
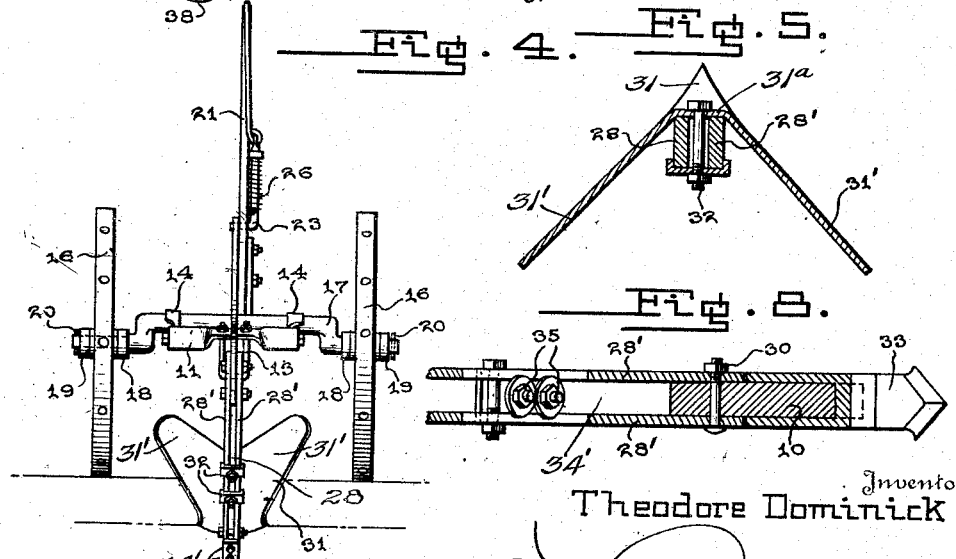
Inventor
Theodore Dominick
By Lancaster Allwine
Attorneys Patented Apr. 5, 1927.

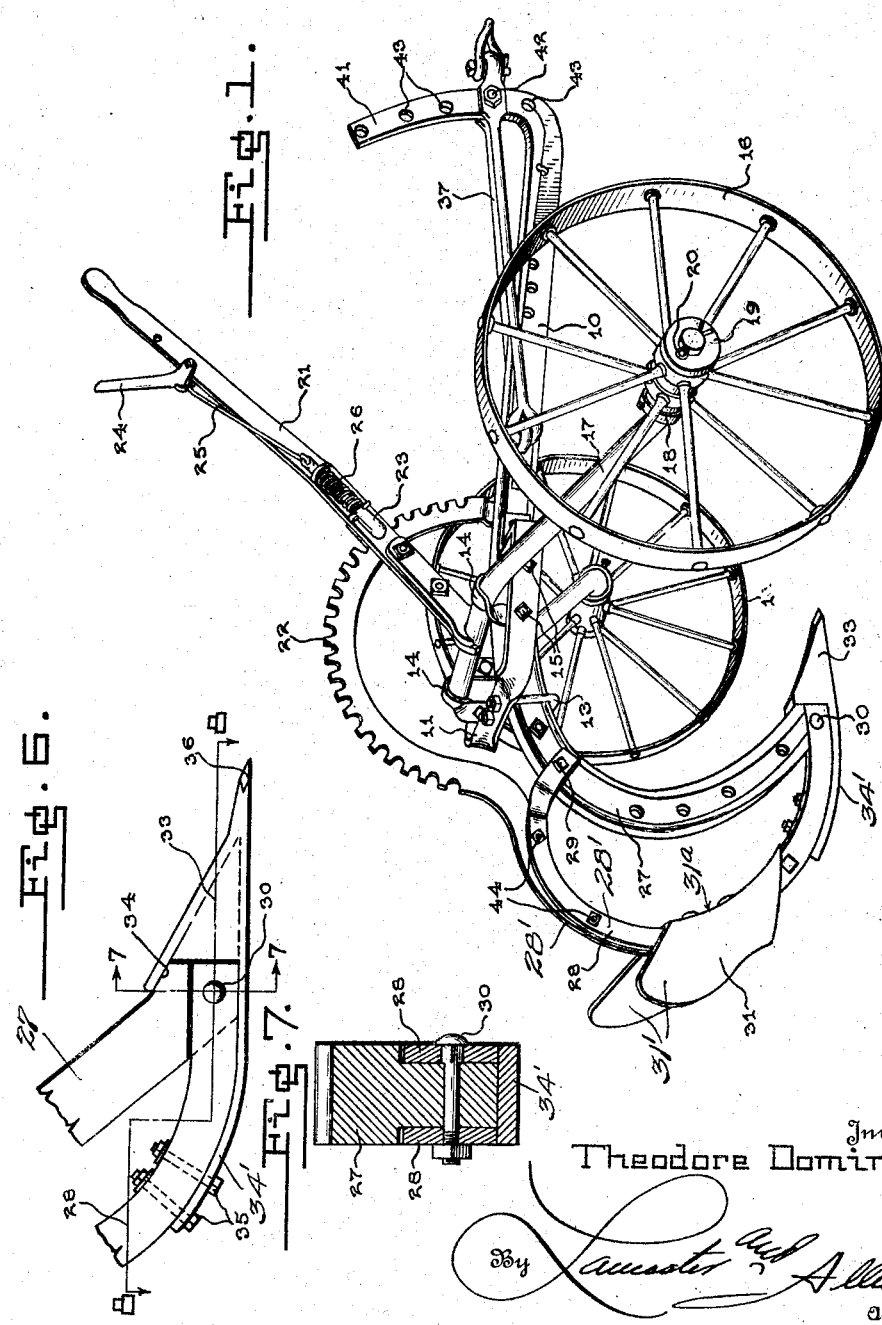

1,623,530

UNITED STATES PATENT OFFICE.

THEODORE DOMINICK, OF WENATCHEE, WASHINGTON.

SUBSOIL DITCHER.

Application filed May 27, 1925. Serial No. 33,282.

The present invention relates to agricultural machinery and more particularly to ditch machines.

An object of this invention is to provide a ditching machine which is adapted to not only make a ditch in the top soil but to loosen the subsoil so that the water entering the ditch will soak into the ground and not wash away.

Another object of this invention is to provide a subsoil ditcher which may be used in the cultivation of orchards to provide a ditch to catch water during the semi-dry season of the year so that the roots of the trees may have sufficient moisture during the dry season, and to loosen the subsoil so as to provide means whereby the roots may receive nitrogen.

A further object of this invention is to provide a device of this character which may be adjusted to any desired depth within the limits thereof.

A still further object of this invention is to provide a device which is strong enough in its frame construction to be used with a tractor or the like and does not require constant attention to insure an evenly plowed ditch.

The above and various other objects and advantages of this invention will in part be described in, and in part be understood from, the following detailed description of the present preferred embodiment, the same being illustrated in the accompanying drawings, wherein:

Fig. 1 is a perspective view of a device constructed according to the present invention.

Fig. 2 is a fragmentary detail side view of the device showing the device set for operation in the top and subsoil, one of the wheels and its axle being cut away to show the construction of the frame.

Fig. 3 is an enlarged fragmentary top view of the forward end of the device.

Fig. 4 is a rear elevation of the device.

Fig. 5 is a transverse section taken on substantially line 5—5 of Fig. 2.

Fig. 6 is a fragmentary detail elevation of the subsoil loosener.

Fig. 7 is a transverse section taken through the same on substantially the line 7—7 of Fig. 6 and Fig. 8 is a transverse section taken through the subsoil loosener on substantially the line 8—8 of Fig. 6 and looking in the direction of the arrows.

Referring to the drawings, 10 designates the frame or body structure of the device and is preferably constructed of a single beam which may be of iron or the like. At the rear of the frame 10 there is secured an axle support 11, which is secured at its forward end to the frame 10 by bolts 12 or the like, and is fastened to the frame at its rear end by a strap bolt 13 or the like. At opposite sides of the axle support 11 there is secured an axle bearing 14, which may be constructed from a flat bar bent in U shape and having its open ends bent at right angles to the closed end, the open ends being bolted to the frame of the support 11 by bolts 15 or the like.

A pair of wheels 16 are mounted at opposite ends of an axle 17 which is preferably bent in U shape, the closed or upper end of the axle passing through the bearings 14, and the wheels 16 being mounted upon the outturned ends of the axle. A collar or ring 18 may be secured to the axle 17 so as to prevent the hub of the wheel 16 from sliding inwardly. The outer end of the axle 17 is provided with a collar or ring 19 which is slipped over the end of the axle and is locked thereupon by a cotter pin 20 or the like.

An adjustable depth regulator 21 is mounted upon the upper end of the axle 17, being positioned substantially midway between the axle bearings 14. The depth regulator 21 is preferably mounted on the axle 17 at right angles to the plane of the open ends thereof, so that when the handle 21 is moved downwardly and forwardly the upper end of the axle rises and carries with it the frame 10. In order to hold the frame 10 in the desired elevation from the ground a toothed rack 22 is mounted upon the frame 10, and a dog 23 or the like is adapted to engage between said teeth in said rack 22. A releasing lever 24 is secured to said regulator 21 adjacent its upper end and is connected by a link 25 or the like to the upper end of said dog 23. A spring 26 or the like may be mounted upon the dog 23 to normally hold the same in locked position.

The rear end of the frame 10 is curved downwardly and forwardly as at 27. An arcuate plow frame 28, comprising a pair of spaced arcuate members 28', is mounted at its upper and forward end upon the rear end of the frame 10, being secured thereto by bolts 29 or the like. The lower end of the plow frame 28 is fastened to the lower end of the frame 10 by a bolt 30 or the like. In the example shown the arcuate members 28' are secured to opposite sides of the frame 10, the latter holding them in spaced relation as may be observed from Figures 1 and 8. Intermediate the ends of the frame 28 there is provided a plow or ditch digger 31, the opposite sides or mouldboards 31' of which fan out from a central arcuate web 31ª so as to cut a wide swathe in the ground. The plow 31 may be detachable and adjustably secured to the frame 28 by bolts 32 or the like, which extends thru web 31ª and between the member 28' so that the removal or adjustment of the plow may be accomplished without detaching the frame 28 from the body 10. The plow 31 is adapted to cut a ditch through the top soil, but it has been found that the mere digging of a ditch between the rows of trees in an orchard will not prevent the water from flowing away nor will it loosen the hard subsoil close to the roots of the trees.

A subsoil loosener 33 is shoe-like in shape and is mounted upon the lower end of the frame 10 and extends forwardly therefrom. The upper end or tongue 34 of the subsoil loosener 33 is adapted to fit over the lower end of the frame 10 and the rear or heel portion 34' of the subsoil loosener 33 is curved upwardly and secured to the frame 28 by bolts 35 or the like, extending thru the heel portion and between the members 28'. The forward end of the subsoil loosener 33 is preferably sharpened to a substantially keen edge and is beveled upwardly as at 36, so that the subsoil loosener 33 has a tendency to pull downwardly.

A pair of adjustable stabilizer or pull rods 37 are pivotally mounted upon a pair of hooks 38 which are mounted upon opposite sides of the frame 10 intermediate the ends thereof, and are secured to the frame by a bolt 39 or the like. The pull rods 37 are preferably constructed of one bar which is bent back upon itself, and formed into a loop 40 at the forward end thereof. The forward end of the beam 10 is bent upwardly and arcuately toward the rear, and the stabilizers 37 are adapted to be adjustably secured to the upstanding end 41 of the beam 10 by a bolt 42 which is adapted to pass through the rods 37 and a selected opening 43 in the arc 41.

The forward end of the tooth rack 22 is secured to the beam 10 intermediate the ends thereof, and the rear end of the rack is mounted between the members 28' of the plow frame 28 by a plurality of bolts 44 or the like. The rear end of the rack 22 substantially conforms to the configuration of the plow frame 28.

In order to move the device without digging a ditch, the handle 21 is moved forwardly and downwardly to a position substantially as shown in Fig. 1. In this position the frame 10 is held in a relatively high position above the ground, and the subsoil loosener 33 is carried in spaced relation to the ground so that it will not dig thereinto. However, when the device has been moved to the desired location, the handle 21 is moved upwardly, and simultaneously the frame 10 is lowered until the subsoil loosener 33 strikes the ground and begins to dig thereinto with the forward movement of the device. When the desired depth has been reached by the subsoil loosener 33 the handle 21 may be locked upon the rack 22, and the forward end of the stabilizer 37 may then be adjusted upon the segment 41 so that it is substantially parallel with the ground. When the device has been set for operation in the ground it assumes a position somewhat similar to that shown by Figs. 2 and 4. As shown in these illustrations the wheels 16 ride over the surface of the ground, and the subsoil loosener 33 and plow 31 are substantially under the surface. The subsoil loosener 33 is not adapted to throw the dirt out of the path which it cuts, but to merely loosen the dirt and permit most of it to fall back into the narrow pathway cut by the point.

It is, of course, understood that various changes and modifications may be made in the details of construction and design of the above specifically described embodiment of the invention without departing from the spirit thereof, such changes and modifications being restricted only by the scope of the following claims.

What is claimed is:

1. In a subsoil ditcher, the combination of a main frame including a beam provided with a downwardly and forwardly curved rear portion, a plow frame comprising a pair of arcuate spaced members disposed with their concave faces in the direction of travel of the ditcher and having their upper and lower ends secured to opposite sides of said rear portion of the beam, a plow comprising a double mouldboard and a central arcuate web joining same, said plow disposed on said plow frame with said web engaging the concave faces of the arcuate members thereof, bolts extending thru said web and between said arcuate members detachably and adjustably securing the plow to its frame, and a subsoil loosener at the lower end of the rear portion of said beam.

2. In a subsoil ditcher, the combination of a main frame including a beam provided with a downwardly and forwardly curved rear portion, a plow frame comprising a pair of arcuate spaced members disposed with their concave faces in the direction of travel of the ditcher and having their upper and lower ends secured to opposite sides of said rear portion of the beam, a surface ditching plow carried by said plow frame, a subsoil loosener of shoe-like shape disposed on the lower end of the rear portion of said beam and including a tongue and a heel, said tongue extending upwardly in front of the rear portion of the beam and said heel extending rearwardly along the lower portion of said plow frame, and bolts extending thru said heel and between said arcuate members of said plow frame, securing said subsoil loosener to said beam.

3. In a subsoil ditcher, the combination of a main frame including a beam provided with a downwardly and forwardly curved rear portion, a plow frame comprising a pair of arcuate spaced members disposed with their concave faces in the direction of travel of the ditcher and having their upper and lower ends secured to opposite sides of said rear portion of the beam, a surface ditching plow carried by said plow frame, a subsoil loosener of shoe-like shape disposed on the lower end of the rear portion of said beam and including a heel extending rearwardly along the lower portion of said plow frame, and bolts extending thru said heel and between said arcuate members of said plow frame, securing said subsoil loosener to said beam.

4. A subsoil ditcher comprising, a main frame including a beam provided with a downwardly and forwardly curved rear portion, a plow frame comprising a pair of arcuate spaced members disposed with their concave faces in the direction of travel of the ditcher and having their upper and lower ends secured to opposite sides of said rear portion of the beam, a plow comprising a double mouldboard and a central arcuate web joining same, said plow disposed on said plow frame with said web engaging the concave faces of the arcuate members thereof, bolts extending thru said web and between said arcuate members detachably and adjustably securing the plow to its frame, a subsoil loosener of shoe-like shape disposed on the lower end of the rear portion of said beam and including a heel extending rearwardly along the lower portion of said plow frame, and bolts extending thru said heel and between said arcuate members of said plow frame, securing said subsoil loosener to said beam.

5. A subsoil ditcher comprising, a main frame including a beam provided with a downwardly and forwardly curved rear portion, a plow frame comprising a pair of spaced members having their upper and lower ends secured to opposite sides of said rear portion of the beam, a surface ditching plow carried by said plow frame, a subsoil loosener carried by the lower end of the rear portion of said beam, a wheeled mounting for said frame, means for adjusting the relative position of said beam to the wheels, including a lever, a toothed rack, and a pawl carried by said lever for cooperation with said rack, means securing one end of said rack to the beam, and means securing the other end of said rack between said members of the plow frame.

THEODORE DOMINICK.